United States Patent
Mansour et al.

(10) Patent No.: US 12,382,431 B2
(45) Date of Patent: Aug. 5, 2025

(54) OPTIMIZING SPECIAL SUBFRAMES TO MINIMIZE TIME-OF-FLIGHT

(71) Applicant: T-Mobile Innovations LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 474 days.

(21) Appl. No.: 17/880,009

(22) Filed: Aug. 3, 2022

(65) Prior Publication Data

US 2024/0049184 A1 Feb. 8, 2024

(51) Int. Cl.
*H04W 72/02* (2009.01)
*H04W 72/51* (2023.01)
*H04W 72/541* (2023.01)

(52) U.S. Cl.
CPC ........... *H04W 72/02* (2013.01); *H04W 72/51* (2023.01); *H04W 72/541* (2023.01)

(58) Field of Classification Search
CPC ... H04W 72/02; H04W 72/51; H04W 72/541; H04W 72/0446; H04L 5/1469
See application file for complete search history.

(56) References Cited

U.S. PATENT DOCUMENTS

| | | | | |
|---|---|---|---|---|
| 10,973,022 | B1* | 4/2021 | Sung | H04B 17/345 |
| 2013/0242894 | A1* | 9/2013 | Kikuchi | H04W 72/20 370/329 |
| 2015/0296539 | A1* | 10/2015 | Guo | H04W 74/08 370/329 |
| 2018/0205534 | A1* | 7/2018 | Yi | H04W 72/044 |
| 2019/0036833 | A1* | 1/2019 | Bernhard | H04L 47/365 |
| 2019/0182021 | A1* | 6/2019 | Shokri Razaghi | H04L 5/1469 |
| 2020/0382978 | A1* | 12/2020 | Manolakos | H04B 17/309 |
| 2022/0225358 | A1* | 7/2022 | Hong | H04W 72/0446 |
| 2023/0125661 | A1* | 4/2023 | Jebakumar | G06F 9/4856 718/1 |

\* cited by examiner

*Primary Examiner* — Christine Ng
(74) *Attorney, Agent, or Firm* — SHOOK, HARDY & BACON L.L.P.

(57) ABSTRACT

Systems and methods are provided herein the dynamically select a special subframe used in communication between a cell site and a user equipment (UE). The method begins with determining radio interference metrics for a cell site being used for communication with a UE. A time of flight metric is also determined for the cell site. Based on the radio interference metrics and the time of flight metrics, a gap in a special subframe is adjusted. The special subframe provides two configurations, with a first special subframe having a greater number of gap subframes than the second special subframe.

20 Claims, 6 Drawing Sheets

OPTIMIZING SPECIAL SUBFRAMES TO MINIMIZE TIME-OF-FLIGHT

BACKGROUND

Mobile devices use cell sites, which may also be known as cell sites, or cell sites to connect to the wireless network. The wireless network can utilize one or more wireless access technologies, including but not limited to 5G or 6G. In some situations, the location of a cell site or can affect the amount of time data spends "in flight," meaning the data is being transmitted. The amount of time a given transmission spends in flight can depend on the location of the cell site and the nature of the terrain surrounding the cell site. Some cell sites are located near large bodies of water, such as rivers, lakes, or oceans and these locations can adversely affect data time in flight and can also influence signal quality. Longer time in flight can cause disruptions in data transfer and can also affect a user's experience. In some cases, data transfer is not completed or a call can be dropped. The coordination function can be used to identify cell sites that are subject to such time of flight issues. The downlink (DL) and uplink (UL) usage is observed and when a predetermined threshold is reached, the network adjusts the gap is in the special subframe. Dynamically adjusting the gap in the special subframe used in Long Term Evolution (LTE) systems, 5G, and 6G systems can provide increased data throughput and improve user satisfaction.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for optimizing a special subframe are provided. The method dynamically selects a special subframe by first determining radio interference metrics for a cell site used for communication between a cell site and a user equipment (UE). Time of flight metrics are also determined for communication between the cell site and the UE. Based on the radio interference metrics and the time of flight metrics a gap in the special subframe is dynamically adjusted. The time of flight metrics and radio interference metrics are used to determine if the gap in the special subframe should be enlarged. The special subframe provides for a first configuration and a second configuration. The first configuration includes a larger number of gap subframes than the second configuration.

In a further embodiment, a system for dynamically selecting a special subframe is provided. The system includes a cell site and a user equipment (UE). The cell site includes one or more antennas for receiving radio interference metrics from a UE and for transmitting a special subframe to the UE. The processor is configured to determine radio interface metrics for communication between the cell site and the UE and also to determine time of flight metrics for communication between cell site and the UE. Based on the radio interference and the time of flight metrics, a gap in the special subframe is dynamically adjusted.

An additional embodiment provides a non-transitory computer storage media storing computer-useable instructions that, when executed by one or more processors cause the processors to determine radio interference metrics for a cell used for communication with a user equipment (UE) and also to determine time of flight metrics for communication between the cell site and the UE. Based on the radio interference metrics and the time of flight metrics, a gap in the special subframe is dynamically adjusted by selecting one of two special subframe configurations.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
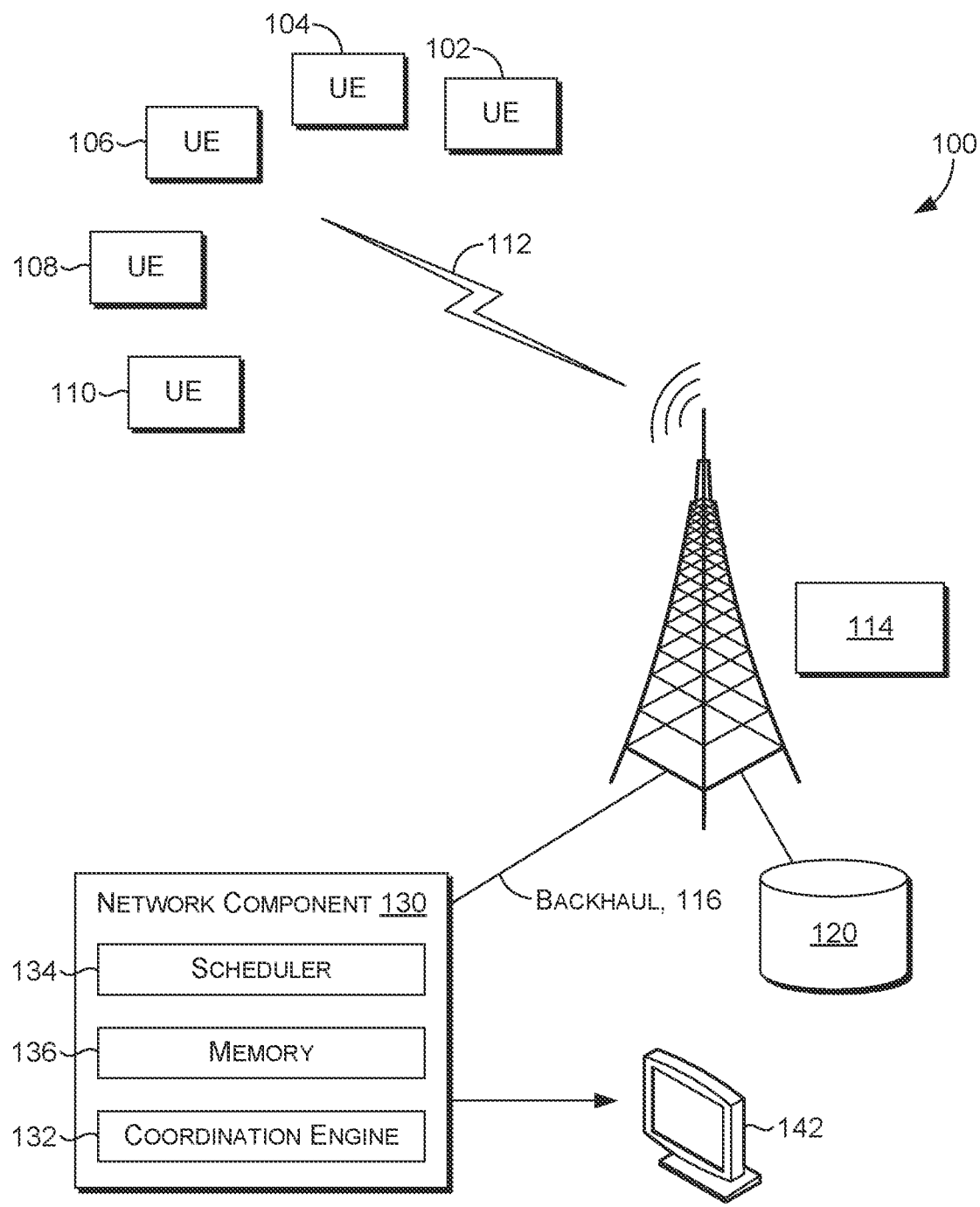
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCFICH Physical Control Format Indicator Channel
PCS Personal Communications Service
PDCCH Physical Downlink Control Channel
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDD Time Division Duplex
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of cell sites (i.e., cell site, node, cell towers) to provide network coverage. The cell sites are employed to broadcast and transmit transmissions to user devices of the telecommunications network. A cell site may be considered to be a portion of a cell site that may comprise an antenna, a radio, and/or a controller. In aspects, a cell site is defined by its ability to communicate with a user equipment (UE), such as a wireless communication device (WCD), according to a single protocol (e.g., 3G, 4G, LTE, 5G, and the like); however, in other aspects, a single cell site may communicate with a UE according to multiple protocols. As used herein, a cell site may comprise one cell site or more than one cell site. Factors that can affect the telecommunications transmission include, e.g., location and size of the cell sites, and frequency of the transmission, among other factors. The cell sites are employed to broadcast and transmit transmissions to user devices of the telecommunications network. Traditionally, the cell site establishes uplink (or downlink) transmission with a mobile handset over a single frequency that is exclusive to that particular uplink connection (e.g., an LTE connection with an EnodeB). In this regard, typically only one active uplink connection can occur per frequency. The cell site may include one or more sectors served by individual transmitting/receiving components associated with the cell site (e.g., antenna arrays controlled by an EnodeB). These transmitting/receiving components together form a multi-sector broadcast arc for communication with mobile handsets linked to the cell site.

As used herein, "cell site" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the cell site is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby cell site. A UE may be, in an embodiment, similar to device 700 described herein with respect to FIG. 7.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby cell site.

In aspects, a UE provides UE data including location and channel quality information to the wireless communication network via the cell site. Location information may be based on a current or last known position utilizing GPS or other satellite location services, terrestrial triangulation, a cell site's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the cell site or at the individual antenna array of the cell site. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In time division duplex (TDD) mode the UE needs to switch transmission from downlink to uplink and uplink to downlink. The special subframe is needed for switching the transmission from downlink to uplink. In TDD there are two periodicity frames, one with 5 ms periodicity, the other with 10 ms periodicity. The special subframe is introduced at the first subframe and the sixth subframe and each half frame of 5 ms carries one special subframe. In the 10 ms periodicity only one special subframe is needed and it is the first subframe. A special subframe includes three past downlink pilot time slots, a guard period, and an uplink pilot time slot. The guard period in the special subframe controls the switching between uplink and downlink transmission. Switching between uplink and downlink has a small hardware delay for both the UE and cell site and the guard period provides compensation for the delay. The guard period should be large enough to cover the propagation delay of downlink interferers.

In accordance with a first aspect of the present disclosure a method for optimizing the special subframe is provided. The method provides for dynamically selecting a special subframe based on a gap in the special subframe. The method begins with determining radio interference metrics for a cell site used for communication with a user equipment. The time of flight metrics for communication between the cell site and the UE are also determined. Then, based on the radio interference metrics and the time of flight metrics, the gap in the special subframe is dynamically adjusted.

A second aspect of the present disclosure provides a system for optimizing special subframes is provided. The system includes a cell site that has one or more antennas for receiving radio interference metrics from a user equipment (UE) and for transmitting to the UE a special subframe. The system also includes a processor that is configured to determine radio interference metrics for communication between the cell site and the UE and also to determine the time of flight metrics for communication between the cell site and the UE. Based on the radio interference metrics and the time of flight metrics, a gap in the special subframe is dynamically adjusted. Dynamically adjusting the gap in the special subframe can include selecting a first configuration of the special subframe that includes a larger number of gap subframes than a second configuration of the special subframe.

Another aspect of the present disclosure is directed to a non-transitory computer storage media storing computer-useable instructions that, when used by one or more processors, cause the processors to determine radio interference metrics for a cell site used for communication with a user equipment (UE) and also to determine time of flight metrics for communication between the cell site and the UE. The processor then determines, based on the radio interference metrics and the time of flight metrics, a gap adjustment in the special subframe. Adjusting the gap in the special subframe can be performed dynamically and one of two special subframe configurations can be selected.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement.

Network environment 100 includes user devices (UE) 102, 104, 106, 108, and 110, cell site 114, and one or more communication channels 112. The communications channels 112 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 700) that communicates via wireless communications with the cell site 114 in order to interact with a public or private network.

Figure 7:
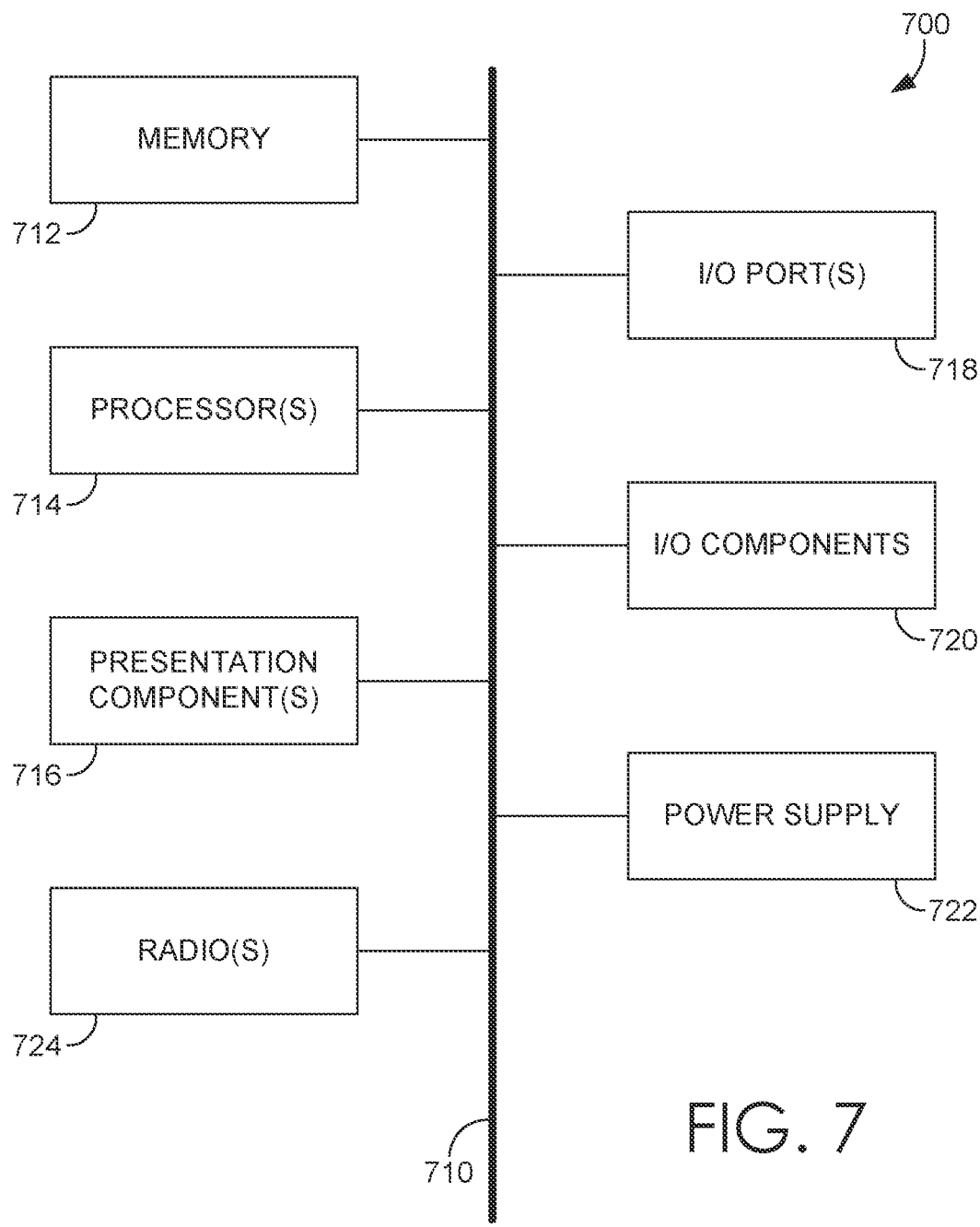
FIG. 7 depicts an exemplary computing device suitable for use in implementations of the present disclosure, in accordance with aspects herein.

In some aspects, each of the UEs 102, 104, 106, 108, and 110 may correspond to computing device 700 in FIG. 7. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through cell site 114. Cell site 114 may be a gNodeB in a 5G or 6G network. A carrier, or mobile network operator, may operate cell sites in multiple locations having different operating conditions that affect the time in flight of data sent over the network. Such conditions may be location dependent, such as cell sites located near large bodies of water, such as lakes, rivers, or seas. Such sites are location dependent and radio morphology dependent.

FDD and TDD are two different spectrum usage techniques. While FDD uses separate frequencies for uplink and downlink communication, TDD uses a single frequency for both uplink and downlink, with devices transmitting a different times. TDD can be more suitable when paired spectrum resources are not available. In general, FDD can provide better coverage, while TDD can provide better capacity. Some TDD networks incorporate point coordination function techniques. This is an optional technique and is used to prevent collisions in IEEE 802.11-based standards. Point coordination function (PCF) is used along with the distributed coordination function (DCF).

The network environment 100 may be comprised of a telecommunications network(s), or a portion thereof. A telecommunications network might include an array of devices or components (e.g., one or more cell sites), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, cell site 114 is configured to communicate with a UE, such as UEs 102, 104, 106, 108, and 110, that are located within the geographic area, or cell site, covered by radio antennas of cell site 114. Cell site 114 may include one or more cell sites, base transmitter stations, radios, antennas, antenna arrays, power amplifiers, transmitters/receivers, digital signal processors, control electronics, GPS equipment, and the like. In particular, cell site 114 may selectively communicate with the user devices using dynamic beamforming.

As shown, cell site 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the cell site 114. Cell site 114 may store the data communicated by the UEs 102, 104, 106, 108, and 110 at a network database 120. Alternatively, the cell site 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the cell site 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a coordination engine 132, a scheduler 134, and a memory 136. All determinations, calculations, and data further generated by the coordination engine 132 and the scheduler 134 may be stored at the memory 136 and also at the data store 140. Although the network component 130 is shown as a single component comprising the coordination engine 132, the scheduler 134, the memory 136, and the data store 140, it is also contemplated that each of the coordination engine 132, the scheduler 134, the memory 136 may reside at different locations, be its own separate entity, and the like, within the home network carrier system.

The network component 130 is configured to retrieve signal quality metrics location data from the cell site or cell site 114 or one of the UEs, 102, 104, 106, 108, and 110. Signal quality metrics can include any one or more of multiple metrics, such as signal-to-interference and noise (SINR), reference signal received power (RSRP), and reference signal received quality (RSRQ). The network component 130 can also track uplink and downlink user traffic. The scheduler 134 can be an artificial intelligence (AI) based scheduler that can observe application usage using measurement metrics such as SINR, RSRP, and RSRQ and can extract a traffic or packet generation model using deep packet inspection. The scheduler 134 can be located in a central office or other centralized location for a virtualized radio access network. For a distributed radio access network, the scheduler 134 can be located at the cell site 114. The cell site 114 may be a gNodeB that interfaces with the scheduler 134. The coordination engine 132 tracks the frame structure in use as well as the number of UEs communicating over the cell site 114. The coordination engine 132 is in communication with the scheduler 134. The scheduler 134 determines the optimization needed for the special subframe and transmits that information to the affected UEs, which may be UEs 102, 104, 106, 108, and 110 of FIG. 1.

Figure 2:
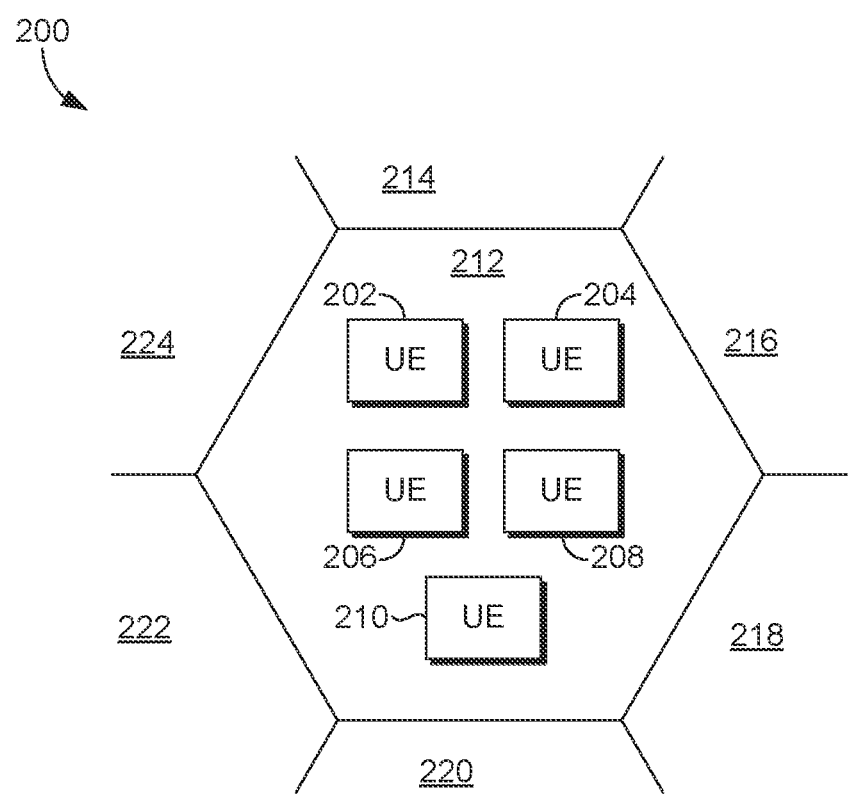
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, and 224, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell site currently occupying, such as cell site 212 and can move to other cell sites such as adjoining cell sites 214, 216, 218, 220, 222 and 224.

Figure 3:
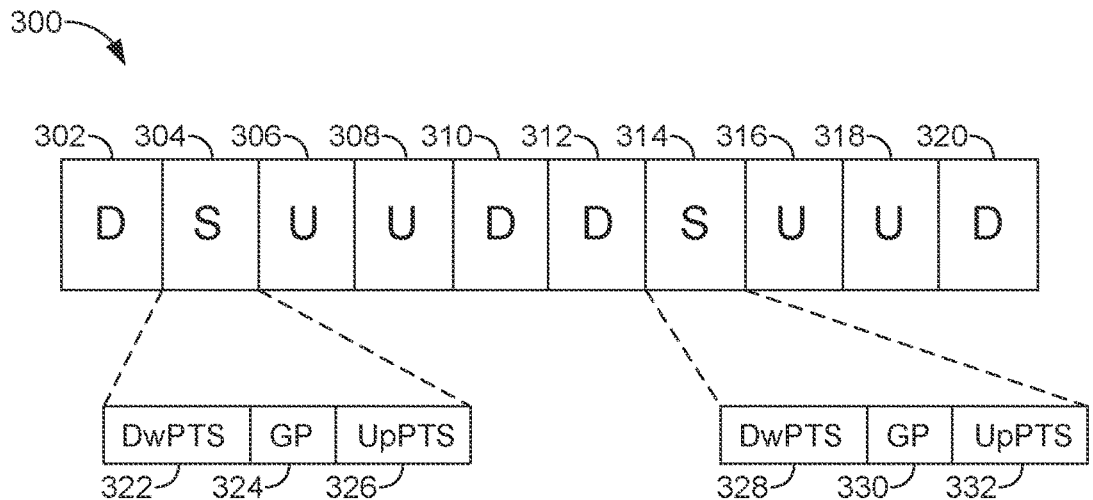
FIG. 3 depicts a frame structure suitable for use in implementations of the present disclosure, in accordance with aspects herein.

FIG. 3 depicts a frame structure suitable for use in implementations of the present disclosure, in accordance with aspects herein. The frame 300 includes subframes dedicated to downlink (D) transmission, uplink (U) transmission, and a special subframe (S). The first subframe of the frame 300 is a D subframe 302. D subframe 302 includes the frame descriptor information on the physical control format indicator channel (PCIFCH) and the physical downlink control channel (PDCCH). A UE learns the frame structure from this first D frame 302, using the PCIFCH, which is used at the beginning of each one millisecond subframe. The PCFICH provides information about the number of symbols used for DPCCH transmission. The PDCCH is a physical channel that carrier downlink control information. The PDCCH carriers scheduling assignments and other control information.

The initial D subframe 302 is followed by special subframe S 304, which is followed by two U subframes 306 and 308. Two D subframes 310 and 312 then follow. Another special subframe S 314 follows the two D subframes 310 and 312. Two U subframes 316 and 318 follow S 314. A D subframe 320 concludes the frame 300, which is 10 milliseconds in duration.

When switching from downlink to uplink a special subframe is used after the D subframe. In time division duplex (TDD) mode the network needs to switch transmission from uplink to downlink and from downlink to uplink. This can be accomplished in TDD networks using two periodicity frames, one with a 5 ms periodicity and the other with 10 ms periodicity. The special subframe can be introduced at subframe 1 and subframe 6. Each half frame of the 5 ms frame carriers one special frame. The 10 ms subframe has only one special subframe as subframe 1. A special subframe has three past slots, including the downlink pilot time slots, (DwPTS) 322 and 328, guard period (GP) 324 and 330, and uplink pilot time slot (UpPTS) 326 and 332. These lengths can be configurable, depending on network parameters. In contrast to the switch from downlink to uplink, when switching from uplink to downlink, no special subframe is needed, as shown by U 308 being followed immediately by D 310 in FIG. 3.

Figure 4:
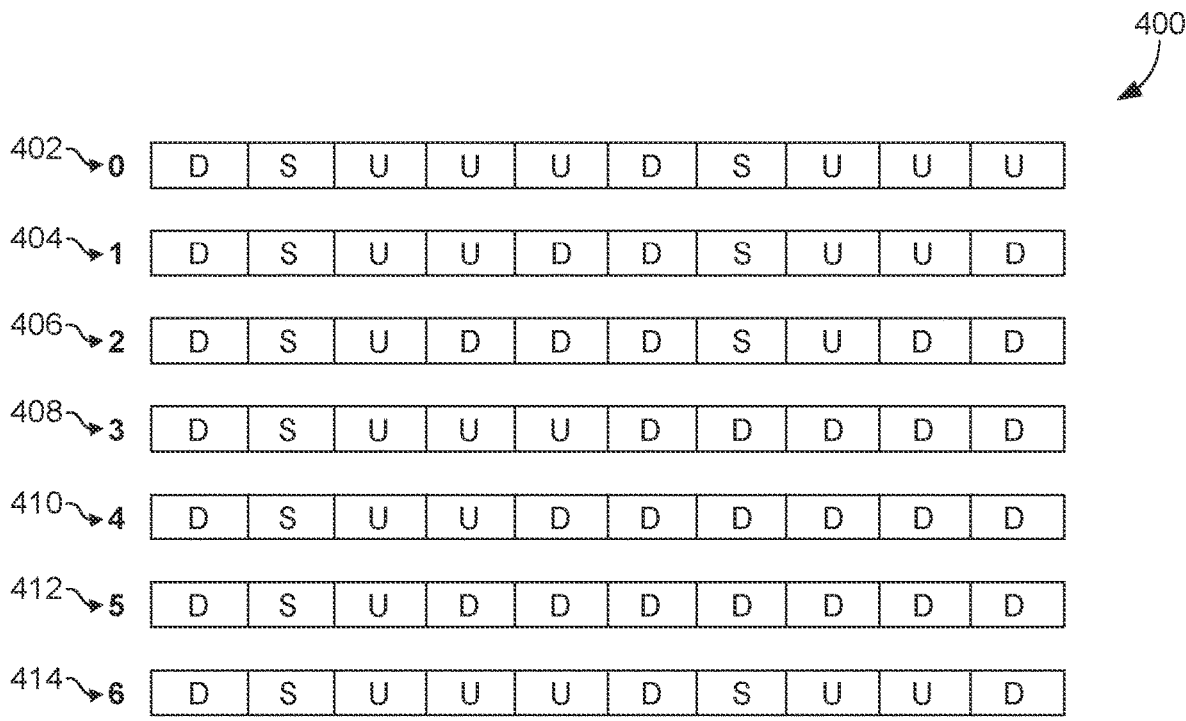
FIG. 4 depicts various frame configurations, in which implementations of the present disclosure may be employed, in accordance with aspects herein.

FIG. 4 depicts various frame configurations, in which implementations of the present disclosure may be employed, in accordance with aspects herein. In a TDD network there are seven possible frame configurations 400, each based on a different downlink/uplink partition. The downlink/uplink ratio can vary from 1/3 as in frame configuration 0 402 shown in FIG. 4 to 8/1, as in frame configuration 1 404 in FIG. 4. Frame configuration 2 404 provides additional downlink transmission frames in comparison with frame configuration 1 402. Frame configuration 3 408 provides additional downlink frames after three uplink frames. Frame configuration 4 410 further increases the number of additional downlink frames, as does frame configuration 5 412. In contrast, frame configuration 6 414 provides more uplink transmission frames. A network operator chooses a specific TDD frame configuration based on network needs and service requirements.

Figure 5:
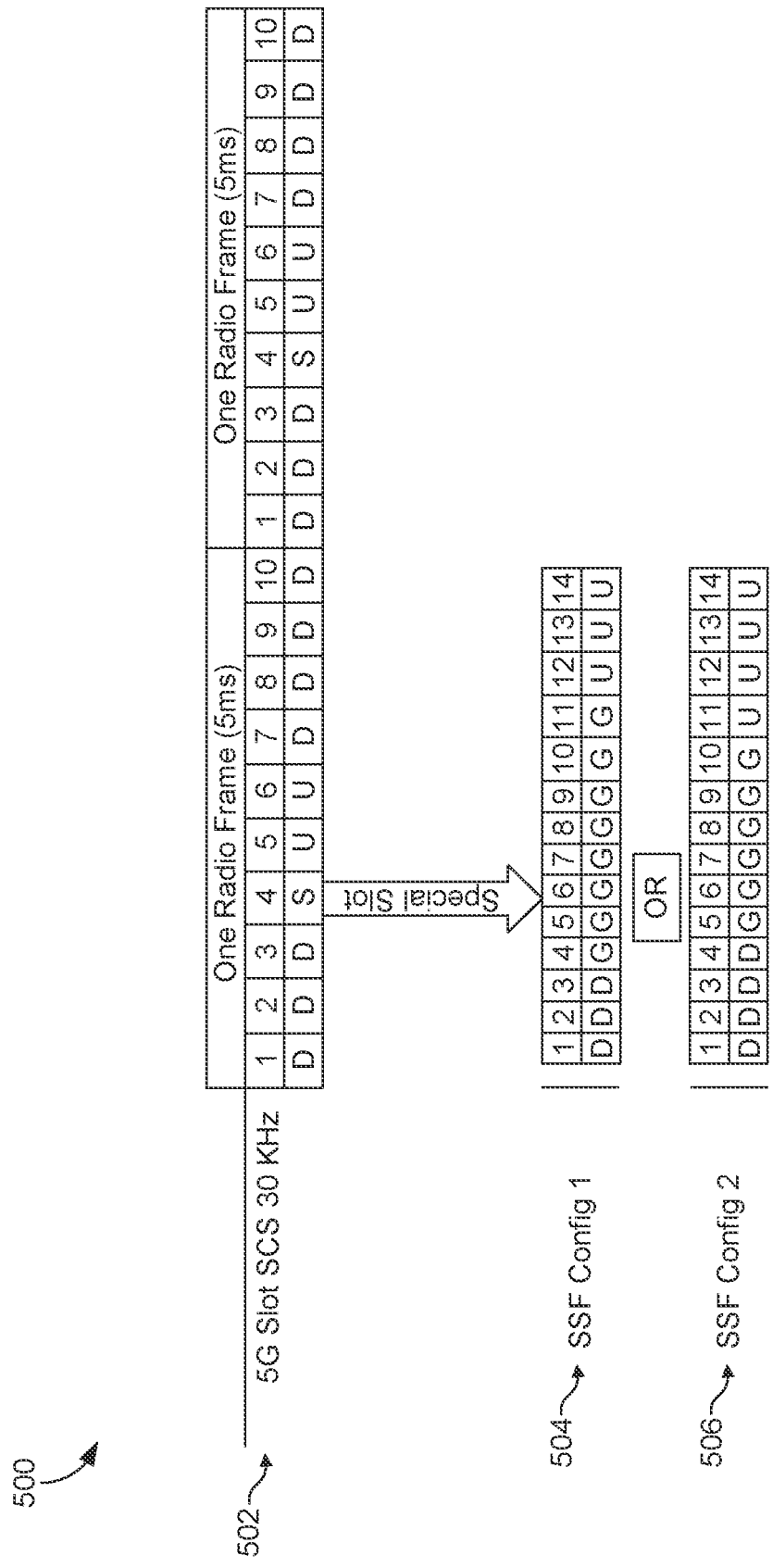
FIG. 5 depicts the special subframe configurations suitable for use in implementations of the present disclosure, in accordance with aspects herein.

FIG. 5 depicts the special subframe configurations suitable for use in implementations of the present disclosure, in accordance with aspects herein. The special subframe is used in frame structure 500 with a 5G slot 502, shown in FIG. 5. The 5G slot can be a slot having frame configuration 2 404, shown in FIG. 4. Frame configuration 2 404 provides an 80:20 ratio, with eighty percent downlink frames to twenty percent uplink frames. The frame configuration 2 404 can be used in conjunction with a special subframe have a downlink portion/gap/uplink portion ratio of 6:4:4. The coordination function is used in conjunction with the special subframe configurations of FIG. 5.

The special subframe can be used in place of a normal special subframe in position 4 in the 5G slot 502. In turn, the special subframe can be provided in two different configurations. The first special subframe configuration 504 provides three downlink segments followed by eight gap segments, followed by three uplink segments. The second special subframe configuration 506 provides for four downlink segments followed by six gap segments, followed by four uplink segments.

The special subframe can be used in conjunction with the coordination function. The coordination function identifies interferers and interfered cell sites that are subject to time of flight issues. The time of flight can create a need for a larger gap in the special subframe, however, the larger gap is not always needed. Dynamically adjusting the gap in the special subframe provides an optimized performance. The gap in the special subframe can be adjusted on a semi-dynamic basis based on the knowledge of cell site and system performance. For example, some cell sites are busy at certain times of day, such as morning and evening rush hours. At these times, the downlink/uplink usage can be predicted, based on historical data collected from the cell site and network. At such busy times, the downlink/uplink usage can be measured as a percentage of usage. The coordination engine can plan for such times and adjust the gap in the special subframe so that configuration 1 504 is used. In contrast, at less busy times, configuration 2 506 can be used.

Figure 6:
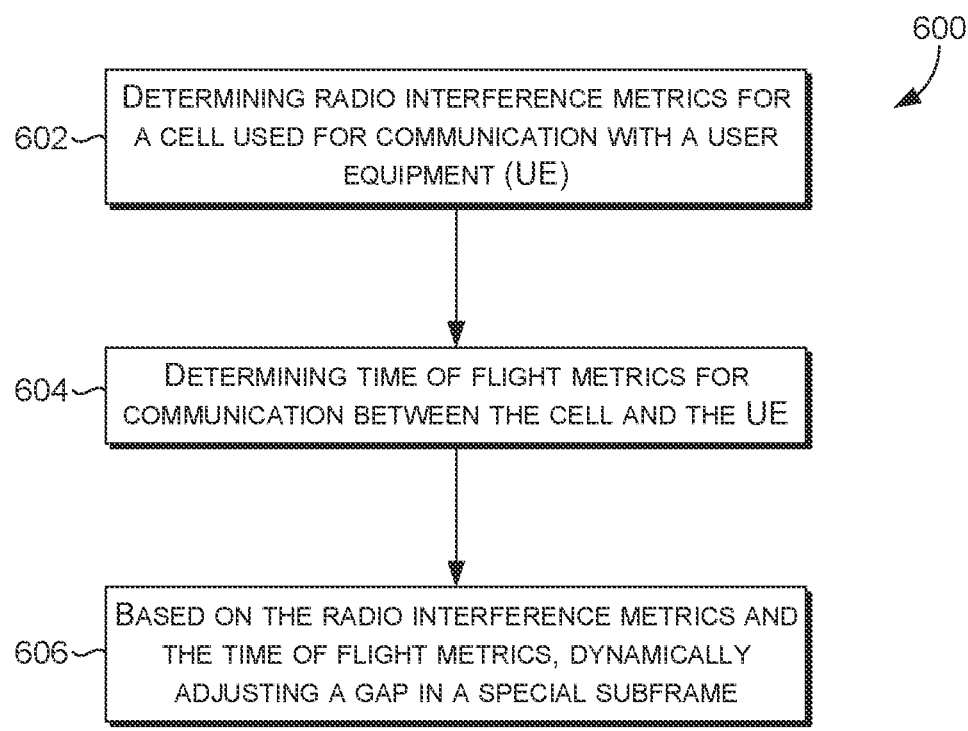
FIG. 6 is a flow diagram of an exemplary method for special subframe optimization, in which aspects of the present disclosure may be employed, in accordance with aspects herein.

FIG. 6 depicts an exemplary computing device suitable for use in implementations of the present disclosure, in accordance with aspects herein. With continued reference to FIG. 6, computing device 600 includes bus 602 that directly or indirectly couples the following devices: memory 604, one or more processors 606, one or more presentation components 608, input/output (I/O) ports 612, I/O components 610, radio 616, transmitter 618, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 610. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604 or I/O components 610. One or more presentation components 608 present data indications to a person or other device. Exemplary one or more presentation components 408 include a display device, speaker, printing component, vibrating component, etc. I/O ports 612 allow computing device 600 to be logically coupled to other devices including I/O components 610, some of which may be built into computing device 600. Illustrative I/O components 610 include a microphone, joystick, game pad, satellite dish, scanner, printer, wireless device, etc.

The radio 616 represents one or more radios that facilitate communication with a wireless telecommunications network. While a single radio 616 is shown in FIG. 6, it is contemplated that there may be more than one radio 616 coupled to the bus 602. In aspects, the radio 616 utilizes a transmitter 618 to communicate with the wireless telecommunications network. It is expressly conceived that a computing device with more than one radio 616 could facilitate communication with the wireless telecommunications network via both the first transmitter 618 and an additional transmitters (e.g. a second transmitter). Illustrative wireless telecommunications technologies include CDMA, GPRS, TDMA, GSM, and the like. The radio 616 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a cell site, a communications tower, or even cell sites (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically selecting a special subframe, comprising:
   determining radio interference metrics for a cell site used for communication with a user equipment (UE);
   determining time of flight metrics for the communication between the cell site and the UE; and
   based on the radio interference metrics and the time of flight metrics between the cell site and the UE, dynamically adjusting a gap in a special subframe, wherein the gap in the special subframe is adjusted to be larger as the time of flight metrics increase.

2. The method of claim 1, wherein dynamically adjusting the gap in a special subframe selects a first configuration or a second configuration of the special subframe.

3. The method of claim 2, wherein the first configuration of the special subframe includes eight gap subframes.

4. The method of claim 3, wherein the eight gap subframes follow three downlink subframes.

5. The method of claim 4, wherein the eight gap subframes are followed by three uplink subframes.

6. The method of claim 2, wherein the second configuration of the special subframe includes six gap subframes.

7. The method of claim 6, wherein the six gap subframes follow four downlink subframes.

8. The method of claim 7, wherein the six gap subframes are followed by four uplink subframes.

9. The method of claim 2, wherein the first configuration of the special subframe includes a greater number of gap subframes than the second configuration of the special subframe.

10. The method of claim 2, wherein selecting the first configuration of the special subframe is based on at least one of the radio interference metrics and the time of flight metrics exceeding a predetermined threshold.

11. The method of claim 10, wherein the predetermined threshold is based on historical data collected from the cell site.

12. The method of claim 10, wherein the predetermined threshold is measured as a percentage of downlink to uplink usage.

13. The method of claim 10, wherein the predetermined threshold is based on a location of the cell site.

14. The method of claim 10, wherein the predetermined threshold is based on a time of day.

15. A system for dynamically selecting a special subframe, comprising:
   a cell site including one or more antennas for transmitting radio interference metrics to the cell site and for receiving from the cell site a special subframe, and a processor, the processor configured to:
   determine radio interference metrics for communication between the cell site and the UE;
   determine time of flight metrics for communication between the cell site and the UE; and
   based on the radio interference metrics and the time of flight metrics between the cell site and the UE, dynamically adjusting a gap in the special subframe, wherein the gap in the special subframe is adjusted to be larger as the time of flight metrics increase.

16. The system of claim 15, wherein dynamically adjusting the gap in the special subframe selects a first configuration or a second configuration of the special subframe.

17. The system of claim 16, wherein the first configuration of the special subframe includes a greater number of gap subframes than the second configuration of the special subframe.

18. The system of claim 16, wherein selecting the first configuration of the special subframe is based on at least one of the radio interference metrics and the time of flight metrics exceeding a predetermined threshold.

19. The system of claim 18, wherein the predetermined threshold is based on at least one of the: historical data collected by the cell site and a location of the cell sites.

20. A non-transitory computer storage media storing computer-useable instructions that, when used by one or more processors, cause the processors to:
   determine radio interference metrics for a cell site used for communication with a user equipment (UE);
   determine time of flight metrics for communication between the cell site and the UE; and
   based on the radio interference metrics and the time of flight metrics between the cell site and the UE, dynamically adjusting a gap in a special subframe by selecting one of two special subframe configurations, wherein a first special subframe configuration is selected when the time of flight metrics exceed a predetermined threshold.

* * * * *